May 23, 1961  R. J. BALLMAN  2,985,134
FLAG-OPERATING METER
Filed Sept. 5, 1958  3 Sheets-Sheet 1

INVENTOR.
ROBERT J. BALLMAN
BY Zugelter and Zugelter
ATTORNEYS

May 23, 1961 R. J. BALLMAN 2,985,134
FLAG-OPERATING METER
Filed Sept 5, 1958 3 Sheets-Sheet 2

INVENTOR.
ROBERT J. BALLMAN
BY Zugelter and Zugelter
ATTORNEYS

May 23, 1961 R. J. BALLMAN 2,985,134
FLAG-OPERATING METER
Filed Sept. 5, 1958 3 Sheets-Sheet 3

INVENTOR.
ROBERT J. BALLMAN
BY
ATTORNEYS

United States Patent Office 2,985,134
Patented May 23, 1961

---

2,985,134

FLAG-OPERATING METER

Robert J. Ballman, Springfield Township, Hamilton County, Ohio, assignor to The Herschede Hall Clock Company, Cincinnati, Ohio, a corporation of Ohio Filed Sept. 5, 1958, Ser. No. 759,300

4 Claims. (Cl. 116—114)

This invention relates to coin-operated devices such as parking meters. More particularly, this invention relates to flag-operating mechanisms for parking meters.

An object of this invention is to provide a device for swinging a flag into view to indicate elapse of a predetermined length of time, as indicated on a meter of the type shown in Patents Numbers 2,680,506; 2,839,174; 2,837,195 and 2,931,479.

A further object of this invention is to provide a meter of this type having a first flag which indicates elapse of a first predetermined length of time and a second flag for indicating elapse of a second and greater predetermined period of time.

A further object of this invention is to provide a meter of this type in which both flags pivot on a single axis and a single operating member, which swings toward and away from said axis, actuates both flags.

The above and other objects and features of this invention will be apparent to those skilled in the art to which this invention pertains from the following description, and the drawings, in which.

In the following detailed description, and the drawings, like reference characters indicate like parts.

Figure 3:
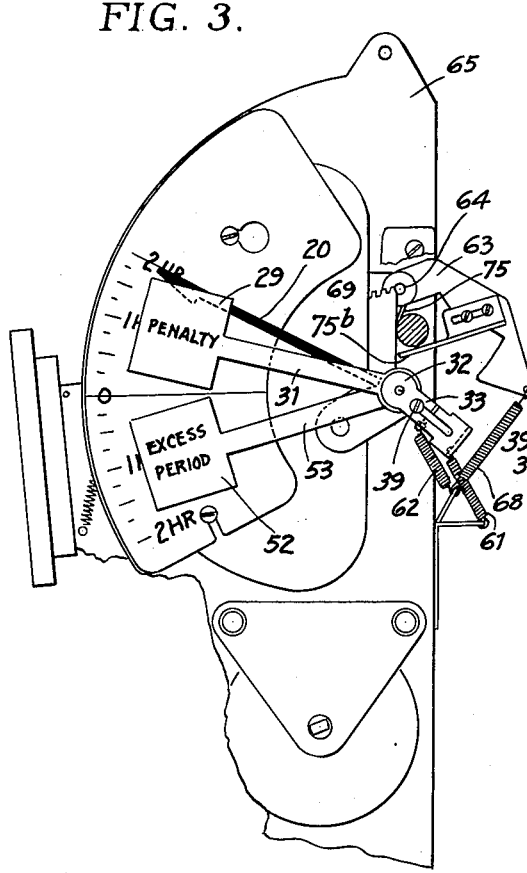
Fig. 3 is a fragmentary view in side elevation showing the side of the working parts of the meter remote from that illustrated in Fig. 2, some frame members being broken away to reveal structural details.
Figure 4:
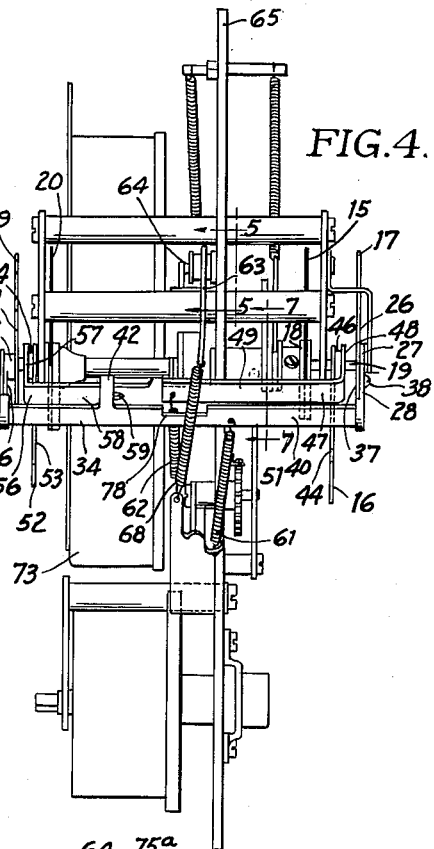
Fig. 4 is a view in rear elevation of the working parts of the meter.
Figure 1:
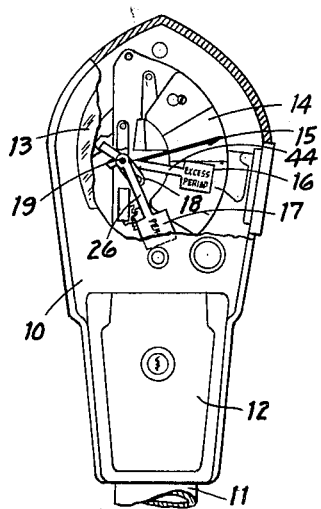
Figure 1 is a view in side elevation of a parking meter constructed in accordance with an embodiment of this invention, a portion of a casing thereof and of a locking member being broken away to reveal details of construction, one flag of the meter being lowered and the other flag being raised.

In Figure 1 is shown a parking meter which includes a housing 10 mounted on a post 11. The lower portion of the housing is provided with a door 12 which can be opened for removal of a coin box (not shown). The upper portion of the housing includes a window 13, only a portion of which is shown, through which a dial 14, an index hand 15, and flags 16 and 17 can be observed. The index hand 15 is secured to a lever 18 which is attached to a rotatably mounted shaft 19. As shown in Figs. 3 and 4, a second index hand 20 is also mounted on the shaft 19. A segment-shaped ratchet 21 (Figs. 2 and 6) is also attached to the shaft 19. A pawl 22 (Fig. 2) carried by a pawl arm 23 is engageable with the ratchet to swing the ratchet and the index hand from the normal position shown in Fig. 2 to a position such as that shown in Fig. 6 when a coin is inserted in the meter. This operation is more fully explained in the aforementioned prior patents.

As the index hand is swung from the Fig. 2 position to the Fig. 6 position, the flags 16 and 17 are also swung from the Fig. 2 position to the Fig. 6 position by mechanism to be described more fully hereinafter.

Figure 6:
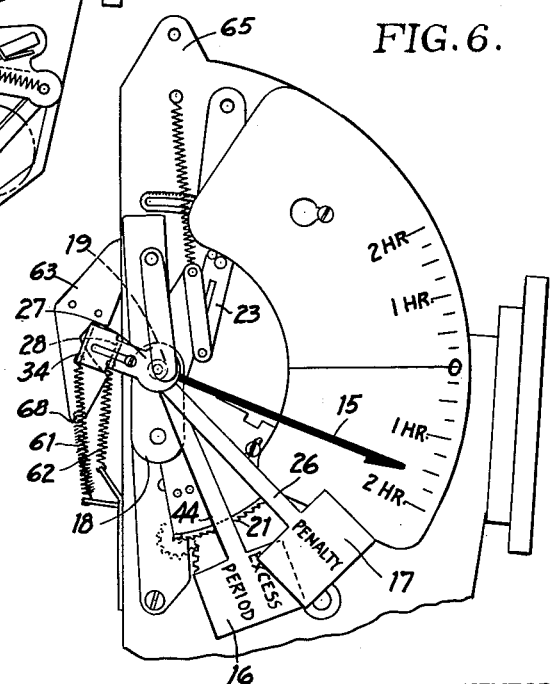
Fig. 6 is a fragmentary view in side elevation showing the working parts of the meter with both flags lowered.

As shown in Figs. 1 and 6, the flag 17 carries a label "PENALTY" and is mounted on a flagstaff 26. One end of the flagstaff 26 is attached to a bearing member 27 which is rotatably mounted on the shaft 19. The bearing member 27 has a slotted arm 28 which extends outwardly therefrom. As shown in Figs. 3 and 4, a second "PENALTY" flag 29 is mounted on a flagstaff 31. The flagstaff 31 is mounted on a bearing member 32 which is rotatably mounted on the shaft 19. The bearing member 32 has a slotted arm 33 which extends outwardly therefrom. The slotted arms 28 and 33 are linked by a U-shaped link 34 (Fig. 4). Ends 36 and 37 of the link 34 are attached to the slotted arms 28 and 33, respectively, by screws 38 and 39, which extend through the slots of the slotted arms so that the spacing of the cross arm 40 of the link 34 from the axis of the shaft 19 may be adjusted. Thus, the link 34 swings with the PENALTY flags 17 and 29. A transverse arm 42 is integral with the cross arm of the link and extends toward the axis of shaft 19. The function thereof will be explained hereinafter.

The flag 16 is labeled "EXCESS PERIOD" and is mounted on a flagstaff 44 (Figs. 1 and 6). One end of the flagstaff 44 is attached to a bearing member 46 (Fig. 4) which is rotatably mounted on the shaft 19 inboard of the slotted arm 28. An L-shaped link member 47 is also attached to the bearing member 46. The link member 47 includes a radial arm 48 attached to the bearing member 46 and a side arm 49 which is parallel to and inboard of the cross arm 40 of the link 34. A circumferentially extending arm 51 (Fig. 8) is integral with the side arm 49.

As shown in Figs. 3 and 4, a second EXCESS PERIOD flag 52 is mounted on a flagstaff 53. The flagstaff 53 is mounted on a bearing member 54 (Fig. 4) which is rotatably mounted on the shaft 19 inboard of the slotted arm 33. An L-shaped link member 56 is also attached to bearing member 54. The link member includes a radial arm 57 attached to the bearing member 54 and a side arm 58 which is parallel to and inboard of the cross arm 40 of the link 34. The side arms 49 and 58 of the link members 47 and 56 overlap and are releasably attached together by a screw 59 to form a cross arm inboard of the cross arm 40.

Figure 2:
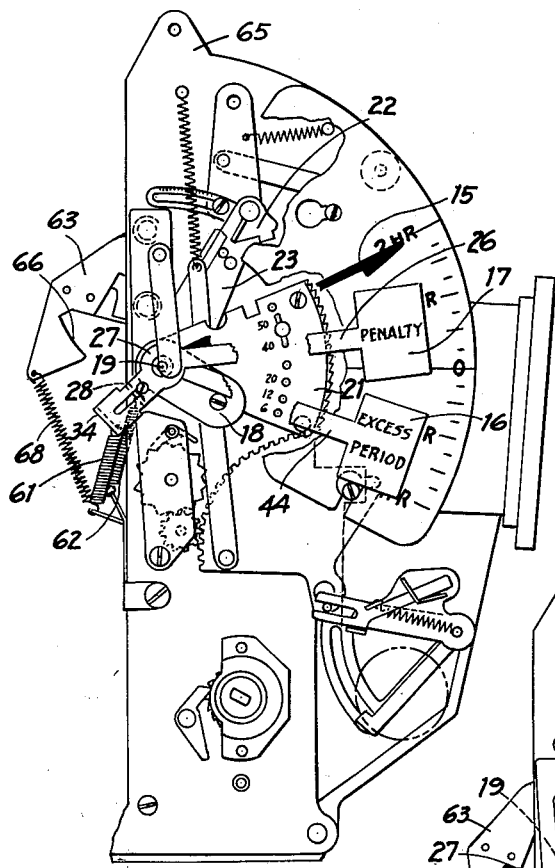
Fig. 2 is a view in side elevation showing the working parts of the meter removed from the casing with both flags in raised position, part of the dial being broken away to show details of construction.

As shown in Figs. 2, 4, and 6, a tension spring 61 attached to the cross arm 40 (Fig. 6) of the link 34 urges the PENALTY flags to raised position. A tension spring 62 attached to the side arm 49 of the link member 47 urges the EXCESS PERIOD flags to raised position. The flags can be held in lowered or retracted position by a hook 63 which is pivotally mounted on a shaft 64 which is mounted on a main frame plate 65. The hook 63 has a circumferentially extending shoulder 66 (see Fig. 2) which can engage and hold the cross arm 40 and the side arm 49 as shown in full lines in Fig. 9 to hold the flags in the lowered or retracted position of Fig. 6. A tension spring 68 urges the hook 63 to the flag-holding position shown in Fig. 6 and in full lines in Fig. 9.

Figure 5:
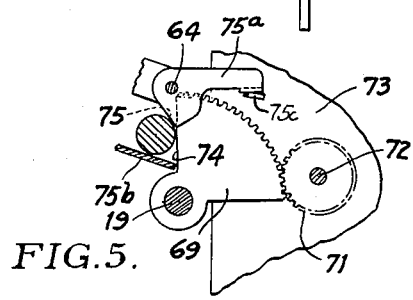
Fig. 5 is a fragmentary view of a section taken on the line 5—5 in Fig. 4.

A segment gear 69 (Fig. 5) is also mounted on the shaft 19 and swings therewith. The segment gear 69 meshes with a pinion 71 mounted on a shaft 72. The shaft 72 extends into a case 73 which houses clockwork (not shown) which controls advance of the index hand 15 in a counter-clockwise direction as shown in Fig. 2. The clockwork may be of the type shown and described in detail in the aforementioned patents. The segment gear 69 has a radial face 74 which is engageable with an arm 75 of a double armed crank 75a to swing the crank 75a clockwise as shown in Fig. 5 to engage a stop crank 75c which extends from the case 73. When the stop crank 75c is firmly engaged by the crank 75a, the clockwork is stopped. The radial face 74 of the segment gear 69 also is engageable with a transverse arm 75b which is attached to the hook 63 as shown in Fig. 3.

Figure 8:
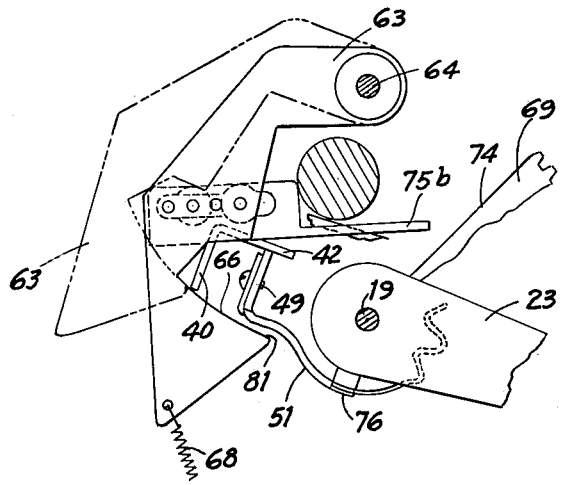
Fig. 8 is a fragmentary view in section taken on the same line as Fig. 7, the working parts being shown in a third position in triple-dot-dash lines and in a fourth position in full lines.
Figure 7:
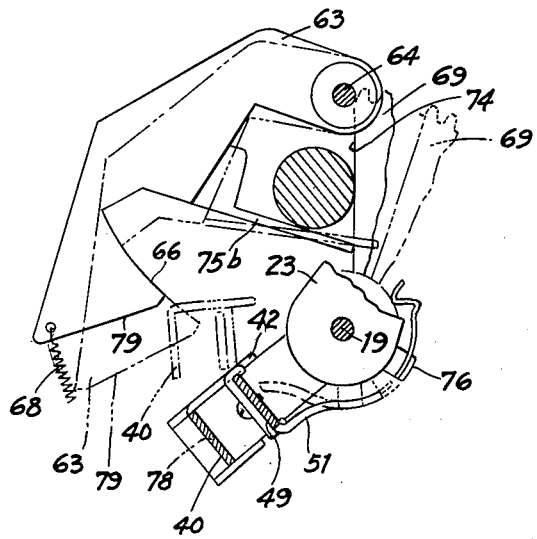
Fig. 7 is a fragmentary, enlarged view in section, taken on the line 7—7 in Fig. 4, the working parts being shown in a first position in full lines and in a second position in double-dot-dash lines.
Figure 9:
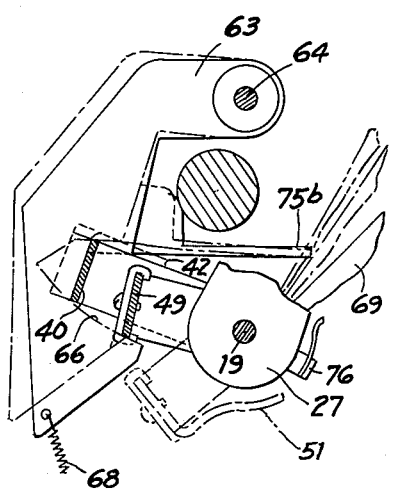
Fig. 9 is an enlarged fragmentary view in section taken on the same line as Fig. 7, the working parts being shown in a fifth position in full lines and in a sixth position in dot-dash lines.

The operation of the mechanism can be most clearly understood by reference to Figs. 7, 8, and 9. When the meter is in its normal or at rest position, the hook 63 is drawn back to the position shown in full lines in Fig. 7 and in Fig. 2. A lug 76 (Fig. 7) mounted on the pawl arm 23 is spaced from the end of the circumferentially extending arm 51, when the meter is in its normal position. When a coin is inserted in the meter the pawl arm 23 and the lug 76 swing clockwise from the position in full lines in Fig. 7 to the position in which the lug is shown in triple-dot-dash lines in Fig. 7. The lug 76 engages the circumferentially extending arm 51 to swing the arm clockwise together with the side arm 49 attached thereto. The transverse arm 42 of the link 34 is engaged by the side arm 49 so that the cross arm 40 also is swung upwardly to the triple-dot-dash line position of Fig. 7. As the pawl arm 23 swings, the gear segment 69 also is swung clockwise from the full line position of Fig. 7 to the triple-dot-dash line position and permits the hook 63 to swing counter-clockwise between the full line position and the triple-dot-dash line position of Fig. 7. As shown most clearly in Fig. 4, there is a cut-away portion 78 on the cross arm 40 and, when the cross arm 40 reaches the triple-dot-dash line position of Fig. 7, a cam surface 79 on the hook is engaged by the cross arm 40 at the cut-away portion 78. As the pawl arm 23 and the lug 76 swing further in a clockwise direction to the position shown in Fig. 8, the hook 63 swings clockwise to the dot-dash line position and then, as the cross arm 40 comes free of the corner 81 of the hook, the hook swings counter-clockwise to the position shown in full lines in Fig. 8. At this position, the transverse arm 75b of the hook 63 is free of the radial face 74 of the segment gear 69.

The pawl arm 23 and the lug 76 then swing back counter-clockwise to the position shown in Fig. 9, and the side arm 49 and the cross arm 40 are lowered to rest on the circumferential shoulder 66 of the hook 63. The mechanism for actuating the pawl arm is more fully set forth in the aforementioned patents.

As already pointed out, the segment gear 69 is mounted on the shaft 19 and swings with the index hands 15 (Fig. 2) and 20 (Fig. 3) and, as shown in Fig. 5, the segment gear 69 also is in mesh with the pinion 71 which is connected to the clockwork of the meter. The return of the segment gear counter-clockwise from the full line position of Fig. 9 through the double-dot-dash line position of Fig. 9 and the triple-dot-dash line position of Fig. 7 to the full line position of Fig. 7 is controlled by the clockwork. As the segment gear swings counter-clockwise, it engages the transverse arm 75b of the hook 63 and first swings the hook 63 to the double-dot-dash line position of Fig. 9 in which the hook comes free of the side arm 49 and the side arm 49 swings downwardly to the double-dot-dash line position of Fig. 9. When the hook 63 swings to this position, the EXCESS PERIOD flag swings from the Fig. 6 position to the Fig. 1 position at which the EXCESS PERIOD flag is visible to indicate that the time paid for on the meter has expired and that the excess period charge is due.

The single hook 63 controls operation of both flags. The EXCESS PERIOD flag swings into view when a predetermined parking time has expired. When the excess period has terminated, the PENALTY flag swings into view to indicate that the predetermined excess period has also expired. The hook 63 is advanced further to the position shown in full line in Fig. 7 to release the cross arm 40 to swing to the full line position of Fig. 7 and the PENALTY flag swings from the Fig. 1 position to the Fig. 2 position.

The flag-operating mechanism illustrated in the drawings and described above is subject to structural modification without departing from the spirit and scope of the appended claims.

Having described my invention, what I claim as new and desire to secure by Letters Patent is:

1. A warning device for a coin operated machine which comprises a shaft, a first flag pivotally mounted on said shaft, a first arm attached to said first flag parallel to and spaced from the axis of the shaft, a second flag pivotally mounted on said shaft, a second arm attached to said second flag substantially parallel to and spaced from the axis of the shaft and from the first arm, a pivotally mounted hook having an axis spaced from and parallel to the shaft, said hook having a shoulder engageable with the first and second arms to hold the first and second flags in a retracted position, a radial member mounted on the shaft and constructed to swing under control of the coin operated machine around the shaft and to engage the hook to swing the hook in a direction to release the first and second arms, means urging the flags to an alternate position when released by the hook, and a flag resetting arm mounted on the shaft to swing around the shaft under control of the coin operated machine to operatively engage the first and second arms to swing the first and second flags to retracted position, the radial member being advanceable away from the hook under control of the coin operated machine, whereby the hook engages the first and second arms to hold the first and second flags in retracted position, the radial member returning in hook-releasing direction at a controlled rate to release the first and second arms.

2. A warning device for a coin operated machine which comprises a shaft, a first flag pivotally mounted on said shaft, a first arm attached to said flag parallel to and spaced from the axis of the shaft, a second flag pivotally mounted on said shaft, a second arm attached to said second flag substantially parallel to and spaced from the axis of the shaft and from the first arm, a pivotally mounted hook having an axis spaced from and parallel to the shaft, said hook having a shoulder engageable with the first and second arms to hold the first and second flags in a retracted position, a radial member mounted on the shaft and constructed to swing under control of the coin operated machine around the shaft and to engage the hook to swing the hook in a direction to release the first and second arms, means urging the flags to an alternate position when released by the hook, and a flag resetting arm pivotally mounted on the shaft to swing around the shaft under control of the coin operated machine and engageable with at least one of the first and second arms and constructed to swing the first and second flags to retracted position, the radial member being advanceable away from the hook under control of the coin operated machine, the hook having a cam surface engageable by one of the first and second arms for swinging the hook into position for engaging the first and second arms as the first and second arms are retracted, whereby the hook engages the first and second arms to hold the first and second flags in retracted position, the radial member returning in hook-releasing direction at a rate controlled by the coin operated machine.

3. A warning device for a coin operated machine which comprises a shaft, a flag pivotally mounted on said shaft, an arm attached to said flag parallel to and spaced from the axis of the shaft, a pivotally mounted hook having an axis spaced from and parallel to the shaft, said hook having a shoulder engageable with the arm to hold the flag in a retracted position, a radial member mounted on the shaft and constructed to swing under control of the coin operated machine around the shaft and to engage the hook to swing the hook in a direction to release the arm, means urging the flag to an alternate position when released by the hook, and a flag resetting arm mounted on the shaft to swing around the shaft under control of the coin operated machine to operatively engage the first mentioned arm to swing the flag to retracted position, the radial member being advanceable away from the hook under control of the coin operated machine, whereby the hook engages the arm to hold the flag in retracted position, the radial member returning in hook-releasing direction at a rate controlled by the coin operated machine.

4. A warning device for a coin operated machine which comprises a shaft, a flag pivotally mounted on said shaft, an arm attached to said flag parallel to and spaced from the axis of the shaft, a hook having a shoulder engageable with the arm to hold the flag in a retracted position, an outwardly extending member mounted on the shaft and constructed to swing under control of the coin operated machine around the shaft and to engage the hook to swing the hook in a direction to release the arm, means urging the flag to an alternate position when released by the hook, and a flag resetting arm mounted on the shaft to swing around the shaft under control of the coin operated machine to operatively engage the first mentioned arm to swing the flag to retracted position, the outwardly extending member being advanceable away from the hook under control of the coin operated machine, whereby the hook engages the arm to hold the flag in retracted position, the outwardly extending member returning in hook releasing direction at a rate controlled by the coin operated machine.

No references cited.